US012698376B2

(12) United States Patent
Hildebrand et al.

(10) Patent No.: US 12,698,376 B2
(45) Date of Patent: *Aug. 4, 2026

(54) DEPOLYMERIZATION OF POLYURETHANES UNDER MILD CONDITIONS

(71) Applicant: Evonik Operations GmbH, Essen (DE)

(72) Inventors: Jens Hildebrand, Johannesberg (DE); Annegret Terheiden, Alpen (DE); Natalia Hinrichs-Tontrup, Alzenau (DE); Walter Pfefferle, Langgoens (DE)

(73) Assignee: Evonik Operations GmbH, Essen (DE)

( * ) Notice: Subject to any disclaimer, the term of this patent is extended or adjusted under 35 U.S.C. 154(b) by 685 days.

This patent is subject to a terminal disclaimer.

(21) Appl. No.: 18/042,566

(22) PCT Filed: Jul. 2, 2021

(86) PCT No.: PCT/EP2021/068323
§ 371 (c)(1),
(2) Date: Feb. 22, 2023

(87) PCT Pub. No.: WO2022/042909
PCT Pub. Date: Mar. 3, 2022

(65) Prior Publication Data
US 2023/0357530 A1     Nov. 9, 2023

(30) Foreign Application Priority Data
Aug. 24, 2020    (EP) ..................................... 20192354

(51) Int. Cl.
*C08J 11/14*        (2006.01)
(52) U.S. Cl.
CPC ............ *C08J 11/14* (2013.01); *C08J 2375/08* (2013.01)
(58) Field of Classification Search
CPC ................... C08J 11/10–28; C08J 2375/04–12
See application file for complete search history.

(56) References Cited

U.S. PATENT DOCUMENTS

| | | |
|---|---|---|
| 3,117,940 A | 1/1964 | McElroy |
| 3,404,103 A | 10/1968 | Matsudaira et al. |
| 3,932,360 A | 1/1976 | Cerankowski et al. |
| 4,196,148 A | 4/1980 | Mahoney |
| 4,283,549 A | 8/1981 | Holm |
| 4,317,939 A | 3/1982 | Gerlock et al. |
| 4,336,406 A | 6/1982 | Gerlock et al. |
| 4,476,318 A | 10/1984 | Harada et al. |
| 5,208,379 A * | 5/1993 | Yang ........................ C08J 11/14 564/468 |
| 5,274,004 A | 12/1993 | van der Wal |
| 5,357,006 A | 10/1994 | Gassan et al. |
| 5,605,935 A | 2/1997 | Parrinello et al. |
| 5,691,389 A | 11/1997 | Parrinello et al. |
| 6,111,129 A | 8/2000 | Barrows et al. |
| 6,133,329 A | 10/2000 | Shieh et al. |
| 6,184,416 B1 | 2/2001 | Ding et al. |
| 6,515,036 B2 | 2/2003 | Murayama et al. |
| 6,858,654 B1 | 2/2005 | Wendel et al. |
| 8,962,704 B2 | 2/2015 | Ryntz et al. |
| 9,051,442 B2 | 6/2015 | Williams et al. |
| 9,453,115 B2 | 9/2016 | Williams et al. |
| 10,155,837 B2 | 12/2018 | Brown et al. |
| 10,421,832 B2 | 9/2019 | Burdeniuc et al. |
| 11,104,757 B2 | 8/2021 | Burdeniuc et al. |
| 2005/0070620 A1 | 3/2005 | Herrington et al. |
| 2005/0261525 A1 | 11/2005 | Ding et al. |
| 2006/0235100 A1 | 10/2006 | Kaushiva et al. |
| 2007/0072951 A1 | 3/2007 | Bender et al. |
| 2007/0270518 A1 | 11/2007 | Nutzel |
| 2010/0093880 A1 | 4/2010 | Bergfeld et al. |
| 2014/0275310 A1 | 9/2014 | Adkins et al. |
| 2016/0264757 A1 | 9/2016 | Krebs et al. |

(Continued)

FOREIGN PATENT DOCUMENTS

| | | |
|---|---|---|
| CA | 2146507 | 10/1995 |
| CA | 2207142 | 12/1997 |

(Continued)

OTHER PUBLICATIONS

Office Action received for U.S. Appl. No. 18/042,595, mailed on Oct. 31, 2025, 13 pages.
Backus, et al., "Polyurethanes", Encyclopedia of Polymer Science and Engineering, vol. 13, pp. 243-303.
Campbell et al., "Polyurethane Waste Disposal Process Development: Amine Recovery", Journal of Applied Polymer Science, vol. 21, Feb. 1977, pp. 581-584.
Dai et al., "Effect of diaminotoluene on the decomposition of polyurethane foam waste in superheated water", Polymer Degradation and Stability, vol. 76, No. 2, (2002), accepted Dec. 10, 2001, pp. 179-184.
Goux et al., "The Reaction Mechanism of p-Toluenediamine Anodic Oxidation: An In Situ ESR-UV/Vis/NIR Spectroelectrochemical Study", ChemPhysChem, vol. 8, Sep. 13, 2007, pp. 2101-2106.

(Continued)

*Primary Examiner* — Stephen E Rieth
(74) *Attorney, Agent, or Firm* — Grüneberg Global IP, PLLC

(57)    ABSTRACT

The present invention relates to an improved process for depolymerization of polyurethanes under mild conditions, wherein polyether polyols and polyamines can be recovered in high yields. The method is practiced by hydrolyzing a polyurethane by contacting with water in the presence of a base containing an alkali metal cation and/or an ammonium cation and having a $pK_b$ value at 25° C. of from 1 to 10 and a catalyst selected from the group consisting of quaternary ammonium salts containing an ammonium cation containing 6 to 30 carbon atoms and organic sulfonates containing at least 7 carbon atoms to yield an active hydrogen containing polyether.

19 Claims, No Drawings

(56)     References Cited

U.S. PATENT DOCUMENTS

| | | | |
|---|---|---|---|
| 2016/0347927 A1 | 12/2016 | Taheri et al. | |
| 2017/0247495 A1 | 8/2017 | Burdeniuc et al. | |
| 2018/0208707 A1 | 7/2018 | Krebs et al. | |
| 2020/0002457 A1 | 1/2020 | Burdeniuc et al. | |
| 2021/0017354 A1 | 1/2021 | Fulev et al. | |
| 2021/0137276 A1 | 5/2021 | Landers et al. | |
| 2022/0017680 A1 | 1/2022 | Modro et al. | |
| 2022/0144996 A1 | 5/2022 | Burdeniuc et al. | |
| 2023/0340223 A1 | 10/2023 | Hildebrand et al. | |
| 2024/0117144 A1 | 4/2024 | Hinzmann et al. | |
| 2024/0309145 A1 | 9/2024 | Terheiden et al. | |
| 2024/0309207 A1 | 9/2024 | Marquardt et al. | |
| 2024/0368331 A1 | 11/2024 | Hubel et al. | |
| 2024/0368332 A1 | 11/2024 | Hubel et al. | |
| 2024/0368333 A1 | 11/2024 | Hubel et al. | |
| 2025/0011565 A1 | 1/2025 | Borchers et al. | |

FOREIGN PATENT DOCUMENTS

| | | | | | |
|---|---|---|---|---|---|
| CA | 2217414 | | 4/1998 | | |
| CA | 2 362 505 | | 8/2000 | | |
| CN | 1322709 A | | 11/2001 | | |
| CN | 110105621 | | 8/2019 | | |
| DE | 37 33 756 | | 4/1989 | | |
| DE | 42 17 524 | | 12/1993 | | |
| DE | 196 22 761 | | 12/1997 | | |
| DE | 102006036007 | | 5/2008 | | |
| EP | 0 592 952 | | 4/1994 | | |
| EP | 0835901 | | 4/1998 | | |
| EP | 0 990 674 | | 4/2000 | | |
| EP | 1 604 972 | | 12/2005 | | |
| EP | 3 067 343 | | 9/2016 | | |
| EP | 3 133 097 | | 2/2017 | | |
| EP | 3 819 323 | | 5/2021 | | |
| EP | 3 940 012 | | 1/2022 | | |
| GB | 858127 | | 1/1961 | | |
| GB | 858127 A | * | 1/1961 | ............... | C08J 9/38 |
| GB | 1 455 454 | | 11/1976 | | |
| JP | 2000-247917 | | 9/2000 | | |
| WO | 93/25610 | | 12/1993 | | |
| WO | 95/10562 | | 4/1995 | | |
| WO | 2008/014988 | | 2/2008 | | |
| WO | 2014/027104 | | 2/2014 | | |
| WO | 2022/042909 A1 | | 3/2022 | | |
| WO | 2022/042910 A1 | | 3/2022 | | |
| WO | 2023/161253 | | 8/2023 | | |

OTHER PUBLICATIONS

Gribkova et al., "Degradation of a Polyisocyanurate obtained by Polycyclotrimerization of 4,4'-Di-Isocyanatodiphenylmethane", Polymer Science, U.S.S.R., vol. 22, (1980), pp. 299-304.

Günter Oertel, "Chemistry—Raw Materials—Processing Application—Properties", Polyurethane Handbook, 2nd edition, Hanser/Gardner Publications Inc., Cincinnati, Ohio, 1993, pp. 177-245.

Hartmann et al., "Thermal and Dynamic Mechanical Properties of Polyurethaneureas", Journal of Applied Polymer Science, vol. 35, May 20, 1988, pp. 1829-1852.

Henri Ulrich, "Thyroid and Antithyroid Preparations to Vinyl Polymers", Urethane Polymers, Kirk-Othmer Encyclopedia of Chemical Technology, Third Edition, vol. 23, 1983, pp. 576-608.

International Search Report received for PCT Application No. in PCT/EP2021/068334, mailed on Sep. 8, 2021, 3 pages.

International Search Report received for PCT Application No. PCT/EP2022/067699, mailed on Sep. 26, 2022, 5 pages with English Translation.

International Search Report received for PCT Application No. PCT/EP2022/067701, mailed on Sep. 26, 2022, 5 pages with English Translation.

International Search Report received for PCT Application No. PCT/EP2022/067704, mailed on Sep. 26, 2022, 5 pages with English Translation.

International Search Report received for PCT Patent Application No. PCT/EP2022/067707, mailed on Sep. 29, 2022, 5 pages with English translation.

International Search Report received for PCT Application No. PCT/EP2022/067697, mailed on Oct. 6, 2022, 7 pages with English translation.

International Search Report received for PCT Application No. PCT/EP2022/067705, mailed on Oct. 18, 2022, 6 pages with English translation.

International Search Report received for PCT Application No. PCT/EP2022/067706, mailed on Oct. 18, 2022, 4 pages.

International Search Report received for PCT Application No. PCT/EP2022/080259, mailed on Feb. 27, 2023, 4 pages.

International Search Report received for PCT Application No. PCT/EP2023/054374, mailed on May 31, 2023, 4 pages.

International Search Report received for PCT Application No. PCT/EP2023/054375, mailed on Jun. 13, 2023, 4 pages.

International Search Report received for PCT Application No. PCT/EP2023/054376, mailed on May 19, 2023, 4 pages.

Meyer et al., "Oxidative transformation processes and products of para-phenylenediamine (PPD) and para-toluenediamine (PTD)—a review", Environmental Sciences Europe, vol. 27, No. 11, May 27, 2015, pp. 1-16.

Souza et al., "Assessment of the autoxidation mechanism of p-toluenediamine by air and hydrogen peroxide and determination of mutagenic environmental contaminant in beauty salon effluent", Science of the Total Environment, vol. 685, Jun. 18, 2019, pp. 911-922.

Ullmanns Encyklopädie der technischen Chemie, "Hormone bis Keramik", 4th Edition, vol. 13, Isocyanate, 1977, pp. 351-353, with partial English translation.

Wegener et al., "Trends in industrial catalysis in the polyurethane industry", Applied Catalysis A: General, vol. 221, Nov. 30, 2001, pp. 303-335.

Werner Siefken, "Mono-Und Polyisocyanate", Justus Liebigs Annalen Der Chemie, vol. 562, Apr. 20, 1949, pp. 75-136, with partial English translation.

Written Opinion received for PCT Application No. PCT/EP2021/068334, mailed on Sep. 8, 2021, 7 pages.

Written Opinion received for PCT Application No. PCT/EP2022/067699, mailed on Sep. 26, 2022, 9 pages with English Translation.

Written Opinion received for PCT Application No. PCT/EP2022/067701, mailed on Sep. 26, 2022, 8 pages with English Translation.

Written Opinion received for PCT Application No., PCT/EP2022/067704, mailed on Sep. 26, 2022, 9 pages with English Translation.

Written Opinion received for PCT Patent Application No. PCT/EP2022/067707, mailed on Sep. 29, 2022, 7 pages with English translation.

Written Opinion received for PCT Application No. PCT/EP2022/067697, mailed on Oct. 6, 2022, 14 pages with English translation.

Written Opinion received for PCT Application No. PCT/EP2022/067705, mailed on Oct. 18, 2022, 12 pages with English translation.

Written Opinion received for PCT Application No. PCT/EP2022/067706, mailed on Oct. 18, 2022, 8 pages.

Written Opinion received for PCT Application No. PCT/EP2022/080259, mailed on Feb. 27, 2023, 5 pages.

Written Opinion received for PCT Application No. PCT/EP2023/054374, mailed on May 31, 2023, 5 pages.

Written Opinion received for PCT Application No. PCT/EP2023/054375, mailed on Jun. 13, 2023, 6 pages.

Written Opinion received for PCT Application No. PCT/EP2023/054376, mailed on May 19, 2023, 7 pages.

U.S. Appl. No. 18/575,869, filed Jan. 1, 2024, Hubel et al.

U.S. Appl. No. 18/575,864, filed Jan. 1, 2024, Hubel et al.

U.S. Appl. No. 18/575,876, filed Jan. 1, 2024, Marquardt et al.

U.S. Appl. No. 18/575,873, filed Jan. 1, 2024, Hubel et al.

U.S. Appl. No. 18/575,870, filed Jan. 1, 2024, Terheiden et al.

U.S. Appl. No. 18/575,878, filed Jan. 1, 2024, Kohlstruk et al.

U.S. Appl. No. 18/706,399, filed May 1, 2024, Borchers et al.

International Search Report dated Sep. 24, 2021, in PCT/EP2021/068323, 3 pages.

Written Opinion dated Sep. 24, 2021, in PCT/EP2021/068323, 9 pages.

(56) References Cited

OTHER PUBLICATIONS

European Search Report dated Feb. 9, 2021, in European Application No. 20192354.7, 8 pages.
Hildebrand et al., U.S. Appl. No. 18/042,595, filed Feb. 22, 2023.
U.S. Appl. No. 18/042,595, filed Feb. 22, 2023, Hildebrand et al.
Marquardt et al., U.S. Appl. No. 18/575,871, filed Jan. 1, 2024.
U.S. Appl. No. 18/575,871, filed Jan. 1, 2024, Marquardt et al.

* cited by examiner

DEPOLYMERIZATION OF POLYURETHANES UNDER MILD CONDITIONS

CROSS-REFERENCE TO RELATED APPLICATIONS

This application is the National Stage entry under § 371 of International Application No. PCT/EP2021/068323, filed on Jul. 2, 2021, and which claims the benefit of priority to European Application No. 20192354.7, filed on Aug. 24, 2020. The content of each of these applications is hereby incorporated by reference in its entirety.

BACKGROUND OF THE INVENTION

Field of the Invention

The present invention relates to an improved process for depolymerization of polyurethanes under mild conditions, wherein polyether polyols and polyamines can be recovered in high yields.

Description of Related Art

Polyurethanes are materials of considerable utility in the production of rigid and flexible foams, solid and microcellular elastomers, sealants, coatings and adhesives. The versatility, relatively low cost, and superior properties of polyurethanes have resulted in the rapid growth of the polyurethane industry over the past 50 years. Currently, many thousand tons of polyurethanes are produced each year throughout the world. Unfortunately, most polyurethanes are thermoset materials which are cross-linked to one degree or another. Unlike thermoplastics such as polyethylene, polypropylene, and polystyrene, scrap or waste polyurethanes thus cannot be readily remelted or reprocessed into useful articles. Since it would be highly desirable for economic and environmental reasons to reuse or recover the large volume of scrap or waste polyurethane generated each year rather than burning it or disposing of it in landfills, considerable inventive effort has been devoted to devising processes for recovering useful chemical components from scrap polyurethane materials.

Glycolysis, as for example disclosed in EP 0 835 901 A2, is used for recycling, i.e. depolymerization, of PUs (polyurethanes) waste including both rigid and flexible type products. These methods require various steps like (1) grinding, (2) step-wise addition of waste to diethylene glycol in the presence of catalyst, (3) alkoxylation, and (4) degassing and filtration for recovering polyols.

Scraps of polyurethane foam may also be recycled via ammonolysis and aminolysis methods by using ammonia, amines, or alkanolamines to retrieve monomeric polyols, which can be reused for the synthesis of PU. DE 102006036007 A1 for example describes a process wherein polyurethanes and polyureas are recycled via aminolysis.

Acidolysis has also been suggested to recycle polyols. None of these processes has been used in large industrial scale, yet. They are too complex, expensive, i.e. require high temperatures and pressures, and the quality of the recycling polyols respectively amines is bad, so that only small amounts can be used together with large amounts of virgin raw materials to produce new polyurethane foams.

Hydrolysis methods were also tested for depolymerization of polyurethanes in the prior art, for example U.S. Pat. No. 4,196,148 A. Hydrolysis of a polyurethane using base catalysis to recover polyether polyols and polyamines as known in the art, however, suffers from several disadvantages. At relatively low temperatures, the hydrolysis rate is slow, respectively the hydrolysis is incomplete. At higher temperatures, the rate is faster but certain undesired side reactions may occur. U.S. Pat. No. 5,208,379 for example suggests a method to hydrolyze a polyurethane produced by reacting an active hydrogen-containing polyether and an organic polyisocyanate, which comprises contacting said polyurethane with water in the presence of an effective amount of a strong base selected from the group consisting of alkali metal oxides, alkali metal hydroxides, alkaline earth metal oxides, and alkaline earth metal hydroxides and an effective amount of an activating agent selected from the group consisting of quaternary ammonium salts containing at least 15 carbon atoms and organic sulfonates containing at least 7 carbon atoms for a time and at a temperature effective to yield the active hydrogen-containing polyether and an organic polyamine. The process of U.S. Pat. No. 5,208,379 is disadvantageous because of the very corrosive conditions applied. Special, very expensive equipment would be needed for implementation in a commercial plant. Even though U.S. Pat. No. 5,208,379 discloses in the general description that the reaction temperature may be chosen in a range of from 80 to 225° C., example 19 shows that at 120° C. only partial hydrolysis took place and example 18 shows that at 140° C. yields were only 70%. Thus, the process of U.S. Pat. No. 5,208,379 cannot economically be used at lower temperatures.

Therefore, a strong need remains to provide more efficient processes for polyurethane recycling to recover polyether polyols and/or polyamines in good quality and good yield.

SUMMARY OF THE INVENTION

Subject of the present invention was to provide a new process for depolymerization of polyurethanes that overcomes the aforementioned deficiencies of prior art methods.

A particular subject of the invention was to provide a process that can be run in standard equipment, i.e. steel reactors.

Another specific problem of the invention was to provide a process that can be operated at lower temperatures compared to the prior art, with good yield.

A further specific problem to be solved by the invention was to provide a process that allows to obtain polyether polyols and/or polyamines in a quality very close to that of the raw materials used to produce the polyurethane that shall be recycled. It should be possible to use recovered polyether polyols and/or polyamines in high proportions for production of new polyurethanes.

Further problems solved by the present invention but not described before, result from the subsequent description and examples.

The inventors surprisingly found out that a method of hydrolyzing a polyurethane, preferably produced by reacting an active hydrogen containing polyether and an organic polyisocyanate, which comprises contacting said polyurethane with water in the presence of a base, the base comprising an alkali metal cation and/or ammonium cation and having a $pK_b$ value at 25° C. of from 1 to 10, and a catalyst selected from the group consisting of quaternary ammonium salts containing 6 to 30 carbon atoms and organic sulfonates containing at least 7 carbon atoms allows to obtain an active hydrogen containing polyether, preferably polyether polyol, and an organic polyamine in high yields.

It was particularly surprising that, in contrast to the teaching of U.S. Pat. No. 5,208,379, a wide variety of cheap and/or low or non-corrosive bases can be used to effectively depolymerize polyurethanes.

The process of the invention is very flexible regarding to the catalyst used. Inventors found out, that ammonium cations with a low number of carbon atoms can be effectively used as well as such with a higher number of carbon atoms. This allows more flexibility regarding the operating temperature.

Recovered active hydrogen containing polyether and/or organic polyamines of the present invention are of excellent quality and can be used in high proportions to produce new polyurethane foams. Even if 100% active hydrogen containing polyether of the present invention are used to produce new polyurethane foams high quality polyurethane foams could be obtained. Without being bond to any theory inventors believe, that the specific mild reaction conditions, the process of the invention avoids the formation of by-products which could cause problems during polyurethane production.

An embodiment of the present invention therefore is a process as defined in the description. A further embodiment is the use of recovered active hydrogen containing polyether, preferably the polyether polyols, and/or organic polyamines of the invention for production of polyurethanes, in particular polyurethane foams.

DETAILED DESCRIPTION OF THE INVENTION

Before describing the invention in more details some important terms are defined as follows: The verb "to comprise" as is used in the description and examples and its conjugation is used in its non-limiting sense to mean that items following the word are included, but items not specifically mentioned are not excluded. "Comprising" includes "consisting of" meaning that items following the word "comprising", are included without any additional, not specifically mentioned items, as preferred embodiment.

Reference to an element be the indefinite article "a" or "an" does not exclude the possibility that more than one of the elements is present, unless the context clearly requires that there is one and only one of the elements. The indefinite article "a" or "an" thus usually means "one or more".

The terms "catalyst" and "activating agent" are used synonymously in the present invention. Polyurethane (PU) in the context of the present invention is especially understood to mean a product obtainable by reaction of polyisocyanates and polyols, or compounds having isocyanate-reactive groups. The polyurethanes which may be subjected to the process of the present invention are preferably those prepared from active hydrogen-containing polyethers and polyisocyanates. Polyurethanes of this type are well known and are described, for example, in Ulrich, "Urethane Polymers", in Encyclopedia of Chemical Technology, Vol. 23, pp. 576-608(1983) and Backus et al., "Polyurethanes", in Encyclopedia of Polymer Science and Technology, Vol. 13, pp. 243-303(1988). Any known polyurethane can be used in the process of the invention.

The active hydrogen-containing polyether preferably is a polyether polyol (i.e., a polyether having primary and/or secondary end groups, preferably hydroxyl groups) but may also be an amine-functionalized polyether (e.g., the "Jeffamine" polyoxypropylamines sold by Texaco Chemical Co.). Such materials are generally made by the catalytic ring-opening polymerization of one or more cyclic ethers such as epoxides, oxetanes, or oxolanes. Initiators having two or more active hydrogens such as polyhydric alcohols, amines, or acids may be employed to vary the functionality (number of active hydrogens) of the polyether. If more than one type of cyclic ether is used, they may be reacted either simultaneously (to yield a random-type copolymer) or sequentially (to yield a block-type copolymer). Illustrative cyclic ethers include propylene oxide, ethylene oxide, butylene oxide, tetrahydrofuran, and oxetane. Examples of suitable active hydrogen-containing polyethers include polypropylene glycol, polyethylene glycol, polytetramethylene glycol, polytrimethylene glycol, ethylene oxide-capped polypropylene glycol, random copolymers of ethylene oxide and propylene oxide.

The structure of the active hydrogen containing polyether, preferably polyether polyols, recovered in the process of the invention correlates to the structure of the active hydrogen containing polyether used to prepare the polyurethane to be treated in the process of the invention.

The structure of the polyamines recovered in the process of the invention correlates to the structure of the polyisocyanates used to prepare the polyurethane to be treated in the process of the invention. "Polyamines" as used in the present invention includes diamines and preferably includes amines having two or more primary amino groups in the molecule.

The polyurethane employed in the process of this invention may be derived from any polyisocyanate reactant (i.e., an organic compound containing two or more isocyanate groups). Suitable polyisocyanates include, but are not limited to, aliphatic diisocyanates, cycloaliphatic diisocyanates, aryl alkyl diisocyanates, aromatic diisocyanates (e.g., toluene diisocyanates and diisocyanatodiphenyl methanes), aromatic triisocyanates, as well as isocyanate mixtures such as the isocyanates commonly referred to as "PMDI". Modified, masked, or blocked polyisocyanates may, of course, also be utilized.

The polyurethane used is the process of the present invention may also include any of the conventional additional reactants or additives known in the art such as for example chain extenders or curatives (relatively low molecular weight active hydrogen-containing compounds such as glycols and di- or polyamines), physical or chemical blowing agents, flame retardants, surfactants, fillers, stabilizers, anti-oxidants, colorants, polymers other than the polyurethane polymer (e.g., styrene-acrylonitrile copolymers such as are found in polymer polyols), catalysts, for example catalysts promoting the gelling reaction (isocyanate-polyol), the blowing reaction (isocyanate-water) and/or the dimerization or trimerization of the isocyanate. The polyurethane may be in solid, microcellular, or foam form and may range from a rubbery, elastomeric, flexible material to a hard, rigid substance.

To facilitate handling of the polyurethane, it is preferably desirable to chop, pulverize, grind, or otherwise comminute the polyurethane such that it is in the form of relatively small particles or granules. If the polyurethane is a foam, it may be partially or fully compressed prior to contacting with the water, strong base, and activating agent. If the polyurethane is in solid form, an initial pulverization step is highly advantageous so as to maximize the surface area available for reaction (thereby reducing the reaction time required to achieve the desired level of hydrolysis).

The process of this invention will result in the effective hydrolytic cleavage of the urethane and urea bonds present in the polyurethane being treated so as to generate active hydrogen containing polyether, in particular polyether polyols, polyamines, and, if the polyurethane was prepared using chain extenders or curatives, low molecular weight glycols, diols, diamines.

The bases used in the present invention comprise an alkali metal cation and/or an ammonium cation and have a $pK_b$ value at 25° C. of from 1 to 10, preferably 1 to 8, more preferred 1 to 7 and most preferred 1.5 to 6. Organic bases, i.e. bases comprising one or more CH bonds, or inorganic base, i.e. bases that do not comprise CH bonds, can be used. Preferably low or non-corrosive base are used. Particular preferred a base is used in the process of the invention selected from the group consisting of alkali metal phosphates, alkali metal hydrogen phosphates, alkali metal carbonates, alkali metal silicates. alkali metal hydrogen carbonates, alkali metal acetates, alkali metal sulfites, ammonium hydroxide, and mixtures thereof. Ammonium cation in the base of the invention includes $NH_4^-$, $NHR_3^-$, $NH_2R_2^-$, $NH_3R^-$, for example ammonium hydroxide includes $NH_4OH$, $NHR_3OH$, $NH_2R_2OH$, $NH_3ROH$, wherein R stand for an organic residue and wherein the residues R in the ammonium cations may be identical or different. Preferably ammonium cation of the base stands for $NH_4^+$. Particular preferred the base of the invention does not comprise alkaline earth metal cations.

Even more preferred a base is used selected from the group consisting of alkali metal phosphates, alkali metal carbonates, alkali metal silicates. ammonium hydroxide, and mixtures thereof.

Most preferred a base is used selected from the group consisting of alkali metal carbonates, alkali metal silicates, and mixtures thereof.

Preferred alkali metals are selected from the group consisting of Na, K and Li and mixtures thereof, most preferred Na and K and mixtures thereof.

Use of the bases described before allows to run the process of the invention in standard equipment, preferably in steel reactors, without special corrosion protection and thus, significantly contributes to a reduction of the invest costs for the plants. It is also possible to use very cheap bases that contribute to reduced operating costs.

The amount of base in the reaction mixture must be sufficient to catalyze the desired hydrolysis of the polyurethane at a practicable rate. Preferably the weight ratio base to polyurethane is in the range of from 0.01 to 50, more preferred 0.1 to 25 and most preferred 0.5 to 20. Preferably the base is used in form of a base solution comprising a base and water, even more preferred as a saturated base solution. If a saturated base solution is used it is preferred that the weight ratio of saturated base solution to polyurethane, calculated at 25° C., is in the range of from of 0.5 to 25, more preferred 0.5 to 15, even more preferred 1 to 10 and most preferred 2 to 7.

Quaternary ammonium salts, organic sulfonates, or some combination or mixture thereof are used as phase transfer catalysts in the process of the present invention. Preferably quaternary ammonium salts are used.

Although the addition of even trace amounts of these catalysts will accelerate the hydrolysis rate, it is preferred that at least 0.5 weight percent catalyst based on the weight of the polyurethane be used, more preferably 0.5 to 15 weight percent, even more preferred 1 to 10 weight percent, particular preferred more 1 to 8 weight percent, especially preferred 1 to 7 and most preferred 2 to 6 weight percent.

The quaternary ammonium salts useful in the invention include those organic nitrogen-containing compounds in which the molecular structure includes a central positively-charged nitrogen atom joined to four organic (i.e., hydrocarbyl) groups, i.e. the ammonium cation, and a negatively charged anion such as halide, preferably chloride, bromide, hydrogen sulfate, alkyl sulfate, preferably methylsulfate and ethylsulfate, carbonate, hydrogene carbonate, carboxylate, preferably acetate, or hydroxide.

Quaternary ammonium salts are well known and are described, for example, in Cahn et al., "Surfactants and Defensive Systems", in Encyclopedia of Chemical Technology, Third Edition Vol. 22, pp. 383-385 (1983) and Catonic Surfactants, E. Jungermann, Ed., Marcel Dekker, New York (1970), pp. 1-173. Many such compounds are commercially available at relatively low cost.

Quaternary ammonium salts containing an ammonium cation containing a total of 6 to 30 carbon atoms have been found to be most effective in the process of the invention. In contrast to the teachings of U.S. Pat. No. 5,208,379, the inventors found out that yields significantly decrease if ammonium cation containing a total of more than 30 carbon atoms are used. The same is true if the number of carbon atoms is below 6.

Catalyst that have proven to be highly efficient and thus are preferably used in the process of the present invention are quaternary ammonium salts having the general structure $R_1 R_2 R_3 R_4 NX$ wherein $R_1$, $R_2$, $R_3$, and $R_4$ are the same or different and are hydrocarbyl groups selected from alkyl, aryl, and arylalkyl and X is selected from the group consisting of halide, preferably chloride and/or bromide, hydrogen sulfate, alkyl sulfate, preferably methylsulfate and ethylsulfate, carbonate, hydrogene carbonate, carboxylate, preferably acetate, or hydroxide.

Preferably $R_1$ and $R_2$ are the same or different and are alkyl groups with 1 to 12, preferably 1 to 10, more preferred 1 to 7, even more preferred 1 to 6, especially preferred 1 to 5 and most preferred 1 to 4 carbon atoms, wherein the alkyl groups may be linear, branched, cyclic, saturated or unsaturated, most preferred are linear saturated alkyl groups, $R_3$ is selected from the group consisting of alkyl groups with 1 to 12, preferably 1 to 10, more preferred 1 to 7, even more preferred 1 to 6, especially preferred 1 to 5 and most preferred 1 to 4 carbon atoms, aryl groups with 6 to 14, preferably 6 to 12, and most preferred 6 to 10 carbon atoms, and aralkyl groups with 7 to 14, preferably 7 to 12, and most preferred 7 to 10 carbon atoms, wherein the alkyl groups may be linear, branched, cyclic, saturated or unsaturated, most preferred linear and saturated, $R_4$ is selected from the group consisting of alkyl groups with 3 to 12, preferably 3 to 10, more preferred 3 to 7, most preferred 4 to 6 carbon atoms, aryl groups with 6 to 14, preferably 6 to 12, and most preferred 6 to 10 carbon atoms, and aralkyl groups with 7 to 14, preferably 7 to 12, and most preferred 7 to 10 carbon atoms, wherein the alkyl groups may be linear, branched, cyclic, saturated or unsaturated, most preferred linear and saturated, and X is selected from the group consisting of halide, preferably chloride and/or bromide, hydrogen sulfate, alkyl sulfate, preferably methylsulfate and ethylsulfate, carbonate, hydrogene carbonate, carboxylate, preferably acetate, or hydroxide.

In a first preferred embodiment the catalyst is a quaternary ammonium salt having the general structure $R_1 R_2 R_3 R_4 NX$ wherein $R_1$ to $R_4$ are defined as described before and are selected such that the sum of carbon atoms of the ammonium cation is 6 to 14, preferably 7 to 14, more preferred 8 to 13.

In a second preferred embodiment the catalyst is a quaternary ammonium salt having the general structure $R_1 R_2 R_3 R_4 NX$ wherein $R_1$ to $R_4$ are defined as described before and are selected such that the sum of carbon atoms of the ammonium cation is 15 to 30, preferably 15 to 28, more preferred 15 to 24, even more preferred 16 to 22 and most preferred 16 to 20.

In a third preferred embodiment the catalyst is a quaternary ammonium salt having the general structure $R_1 R_2 R_3 R_4 NX$ wherein $R_1$ to $R_4$ and X are defined as described before and are selected such that the sum of carbon atoms of the ammonium salt is 6 to 14, preferably 7 to 14, more preferred 8 to 13.

In a fourth preferred embodiment the catalyst is a quaternary ammonium salt having the general structure $R_1 R_2 R_3 R_4 NX$ wherein $R_1$ to $R_4$ and X are defined as described before and are selected such that the sum of carbon atoms of the ammonium salt is 15 to 30, preferably 15 to 28, more preferred 15 to 24, even more preferred 16 to 22 and most preferred 16 to 20.

Most preferred quaternary ammonium salts appropriate for use as the activating agent in the process of this invention include tetrabutylammonium hydrogensulfate, benzyltrimethylammonium chloride, tributyl methyl ammonium chloride and Trioctyl methyl ammonium methyl sulphate.

The other class of activating agents useful in the practice of this invention includes organic sulfonates (i.e., organic compounds containing at least one sulfonate functional group). Such substances have the general formula $$R—SO_3M$$

wherein R is a linear, branched, cyclic saturated or unsaturated alkyl group, an aryl group, or alkyl aryl group containing at least 7 carbon atoms and M is alkali metal (e.g., sodium, potassium), alkaline earth metal (e.g., calcium, barium, magnesium), or ammonium ($NH_4$, $NHR_3$, $NH_2R_2$, $NH_3R$), where M may also be hydrogen provided sufficient strong base is present during the hydrolysis reaction to convert the organic sulfonate into its salt (anionic) form and R is an organic moiety such as methyl or ethyl). Organic sulfonates are described in Cahn et al., "Surfactants and Detersive Systems", in Encyclopedia of Chemical Technology, Vol. 22, pp. 347-360(1983) and McCutcheon, Synthetic Detergents, (1950) pp. 120-151. Preferably organic sulfonate selected from the group consisting of alkyl aryl sulfonates, alpha-olefin sulfonates, petroleum sulfonates and naphthalene sulfonates are used.

Since it is preferred to operate the process of the invention at temperatures as low as possible, it is preferred to use quaternary ammonium salt as the activating agent. Preferably the polyurethane is reacted with water, the base and the catalyst in the process of the invention at a temperature of from 80° C. to 200° C., preferably 90° C. to 180° C., more preferred 95° C. to 170° C. and most preferred 100° C. to 160° C. If the temperature is too low, the yields are insufficient. Too high temperatures are inefficient from an economic point of view and might case side reactions, forming unwanted by-products.

Preferably the polyurethane is reacted with water, the base and the catalyst for 1 minute to 14 hours, preferably 1 minute to 12 hours, more preferred 5 minutes to 12 hours, even more preferred 10 minutes to 12 hours, particular preferred 20 minutes to 12 hours, especially preferred 20 minutes hours to 11 hours and most preferred 30 minutes to 10 hours.

While water functions as a reactant in the desired polyurethane hydrolysis reaction and thus does not need to be present in stoichiometric excess relative to the urethane functional groups in the polymer to be hydrolyzed, it will generally be desirable to utilize a substantial quantity of water in order that it may conveniently serve as a reaction medium and solvent or carrier for the strong base and activating agent. For these reasons, the water is preferably present in condensed (liquid) form. Typically, the weight ratio of polyurethane to water is from 3:1 to 1:15.

The hydrolysis is preferably conducted at atmospheric pressure, although superatmospheric pressures may be employed, if desired. Optionally, a water-miscible or water-immiscible solvent such as alcohol, ketone, ester, ether, amide, sulfoxide, halogenated hydrocarbon, aliphatic hydrocarbon, or aromatic hydrocarbon may be present in the reaction mixture to facilitate the hydrolysis process or to aid in recovering the reaction products.

The hydrolysis reaction may be carried out in a batch, continuous, or semi-continuous manner in any appropriate vessel or other apparatus (for example, a stirred tank reactor or screw extruder) whereby the polyurethane may be contacted with water in the presence of the base and activating agent. It will generally be preferred to agitate or stir the reaction components so as to assure intimate contact, rapid hydrolysis rates, and adequate temperature control.

The active hydrogen containing polyether, organic polyamines, chain extenders, and curatives produced in the hydrolysis may be separated and recovered from the crude reaction mixture using any suitable method or combination of methods known in the art such as for example extraction (using water-immiscible organic solvents as the extractant, for example), distillation, precipitation, filtration.

The recovered active hydrogen containing polyether, in particular polyether polyols obtained in the process of the present invention are of excellent quality. The inventors found out that they can be used to produce polyurethane foams of high quality even without addition of virgin polyether polyol. This is a significant improvement compared to the polyurethane depolymerization processes of the prior art.

The recovered polyamines can be converted to organic polyisocyanates by conventional processes and similarly employed as components of polyurethanes.

Without further elaboration, it is believed that one skilled in the art can, using the preceding description, utilize the present invention of its fullest extent. The following examples, therefore, are to be considered as merely illustrative and not limitative of the remainder of the disclosure in any.

EXAMPLE 1-10 AND COMPARATIVE EXAMPLES 1 TO 7

A reactor from Parr instrumental company equipped with a PTFE liner and a mechanical stirrer, was charged with 25 g of compressed polyurethane foam pieces (ca. 1 cm×1 cm) and 75 g of an aqueous base solution was added. Thereafter catalyst was added, the reactor closed and heated to the operating temperature. After the desired reaction time was over the mixture was allowed to cool down, the reactor was opened and the reaction mixture was transferred into a round-bottom flask.

Water was removed and the remaining solid was extracted with cyclohexane. The cyclohexane solution was washed with 1 N aqueous HCl solution, dried over magnesium sulfate and the solvent was removed. The solid was extracted with warm toluene to obtain the amine after drying and removal of solvent.

The used base solution and catalyst, their amounts, reaction time and temperature as well as yields of the recovered polyether polyol and amine are given in Table 1.

TABLE 1

| Example | Base | pKb | Concentration of base in base solution at ambient temperature | catalyst | Amount of catalyst [wt. %] | Reaction Temperature [C.] | Reaction Time [hours] | Yield Polyether polyol [%] | Yield Polyamine [%] |
|---|---|---|---|---|---|---|---|---|---|
| 1 | $K_2CO_3$ | 3.67 | Saturated in $H_2O$ | TBMAC | 5 | 130 | 14 | 80.4 | N.D. |
| 4 | $Na_2SiO_3$ | 2.23 | Saturated in $H_2O$ | TBAHS | 5 | 150 | 14 | 83 | N.D. |
| 5 | $NH_4OH$ | 4.75 | 25% in $H_2O$ | TBAHS | 5 | 150 | 14 | 80 | N.D. |
| 6 | $K_2CO_3$ | 3.67 | Saturated in $H_2O$ | TBAHS | 5 | 150 | 14 | 81 | 95 |
| 7 | $K_3PO_4$ | 1.77 | Saturated in $H_2O$ | TBAHS | 5 | 150 | 14 | 78 | N.D. |
| 8 | KOAc | 9.25 | Saturated in $H_2O$ | TBAHS | 5 | 150 | 14 | 56 | N.D. |
| 5 | $NH_4OH$ | 4.75 | 25% in $H_2O$ | TBMAC | 5 | 150 | 14 | 78.2 | N.D. |
| 9 | $K_2CO_3$ | 3.67 | Saturated in $H_2O$ | TBMAC | 5 | 150 | 14 | 81.4 | N.D. |
| 10 | $K_2CO_3$ | 3.67 | Saturated in $H_2O$ | TBMAC | 2.5 | 150 | 14 | 66.7 | N.D. |
| CE1 | $K_2SO_4$ | 12.04 | Saturated in $H_2O$ | TBAHS | 5 | 150 | 14 | 3.2 | N.D. |
| CE2 | $CaCO_3$ | | 30% w/w dispersion | TBMAC | 5 | 150 | 14 | 12.56 | N.D. |
| CE3 | $Ca_3(PO_4)_2$ | | 30% w/w dispersion | TBMAC | 5 | 150 | 14 | 11.31 | N.D. |
| CE4 | $Ca(OAc)_2$ | | 30% w/w aq. Solution | TBMAC | 5 | 150 | 14 | 5.15 | N.D. |
| CE5 | $MgHPO_4$ | | 30% w/w dispersion | TBMAC | 5 | 150 | 14 | 3.39 | N.D. |
| CE6 | $MgCO_3$ | | 30% w/w dispersion | TBMAC | 5 | 150 | 14 | 5.15 | N.D. |
| CE7 | $Mg(HCO_3)_2$ | | 30% w/w dispersion | TBMAC | 5 | 150 | 14 | 1.76 | N.D. |

TBMAC = Tributylmethylammonium chloride (C = 13)
TBAHS = Tetrabutylammouniumhydrogensulfate (C = 16)
N.D. = Not Determined The examples show that the process of the invention leads to good yields even at reaction temperatures below 140° C. and under non-corrosive conditions. If the pKb value of the base is too high, as shown in comparative example CE 1, or if alkaline earth metal bases are used, as shown in comparative examples CE 2 to 7, the yields dramatically decrease.

Performance Tests of Recycled Polyols

Production of Hot-Cure Flexible PU Foams (Flexible Slabstock Foam)

For the performance testing of the recycled polyols, the hot-cure flexible PU foam formulations specified in Table 2 were used.

TABLE 2

Formulations for hot-cure flexible PU foam production.

| | Parts by mass (pphp) |
|---|---|
| Formulation 1 | |
| Polyol[1] | 100 parts |
| Water | 4.00 parts |
| KOSMOS ® T9[2] | 0.20 parts |
| DABCO ® DMEA[3] | 0.15 parts |
| TEGOSTAB ® BF2370[4] | 1.0 part |
| Desmodur ® T 80[5] | Variable, Constant Index of 105 |
| Formulation 2 | |
| Polyol[1] | 100 parts |
| Water | 3.00 parts |
| KOSMOS ® EF[6] | 0.60 parts |
| DABCO ® NE1050[7] | 0.15 parts |
| TEGOSTAB ® BF 2370LC[8] | 1.0 part |
| Desmodur ® T 80[5] | Variable, Constant Index of 110 |

[1]Polyol 1: Standard virgin polyol Arcol ® 1104 available from Covestro, this is a glycerol-based polyether polyol having an OH number of 56 mg KOH/g and an average molar mass of 3000 g/mol or inventive recycled polyols or non-inventive recycled polyol. The recycled polyols are obtained by chemical recycling from flexible polyurethane foams. A recycled polyol of the prior art is obtained by the procedure described in the following paragraphs. As inventive recycled polyol the polyol of Example 6 was used
[2]KOSMOS ® T9, available from Evonik Industries: tin(II) salt of 2-ethylhexanoic acid.
[3]DABCO ® DMEA: dimethylethanolamine, available from Evonik Industries. Amine catalyst for production of polyurethane foams.
[4]Polyether-modified polysiloxane, available from Evonik Industries.
[5]Tolylene diisocyanate T 80 (80% 2,4 isomer, 20% 2,6 isomer) from Covestro, 3 mPa · s, 48% NCO, functionality 2.
[6]KOSMOS ® EF, emission free metal catalyst, available from Evonik Industries: tin(II) salt of ricinoleic acid
[7]DABCO ® NE1050: low emission amine catalyst, available from Evonik Industries.
[8]Low emission polyether-modified polysiloxane with <0.03 wt % of total cyclic siloxanes, available from Evonik Industries.

Production of Recycled Polyols for Performance Tests
Recycled Polyol 1 (Non-Inventive)
Recycled Polyol 1 (non-inventive)

The non-inventive recycled polyol 1 was produced following a procedure published by H&S Anlagentechnik in 2012: www.dbu.de/OPAC/ab/DBU-Abschlussbericht-AZ-29395.pdf A Reactor from Parr instrumental company equipped with a glass in liner and a mechanical stirrer, was charged with 300.2 g of compressed polyurethane foam pieces (ca. 1 cm×1 cm). The used polyurethane foam was produced according to Formulation 1, Table 2 by using the conventional polyol Arcol® 1104.

152.64 g of the polyol Arcol® 1104, 75.63 g phthalic acid and 11.97 g hydrogen peroxide (30 wt % in water) were added to the foam pieces. The reaction mixture was heated to 250° C. inner-temperature. The reaction was kept under this condition for 5 hours at an inner-temperature between 237° C. and 256° C. After the heating was stopped the second portion of 140.63 g Arcol® 1104 was added at 160° C. under nitrogen atmosphere. At 80° C. the reaction mixture was decanted and then cooled down to room temperature. The cooled and decanted reaction mixture was used as non-inventive recycled polyol 1. The process was repeated to generate a sufficient quantity recycled polyol for the foaming experiments.

Recycled Polyol 2 (Inventive)

The inventive recycled polyol of Example 6 was used.

General Procedure for Production of the Foam Samples

For each foaming test 300 g or 400 g of polyol was used; the other formulation constituents were recalculated accordingly. 1.00 part of a component denoted 1.00 g of this substance per 100 g of polyol for example.

The foaming was carried out in the so-called manual mixing process. Formulation 1 or Formulation 2 as specified in Table 2 were used. To this end, a paper cup was charged with the different polyols, the respective amine catalyst, the tin catalyst tin(II) 2-ethylhexanoate, water and a foam stabilizer, and the contents were mixed at 1000 rpm for 60 seconds with a disc stirrer. After the first stirring the isocyanate (TDI) was added to the reaction mixture and stirred at 2500 rpm for 7 s and then the reaction mixture was immediately transferred into a paper-lined box (30 cm×30 cm base area and 30 cm height). After being poured in, the foam rose in the foaming box. In the ideal case, the foam blew off on attainment of the maximum rise height and then fell back slightly. This opened the cell membranes of the foam bubbles and an open-pore cell structure of the foam was obtained.

Defined foam bodies were cut out of the resulting hot-cure flexible PU foam blocks and were analyzed further.

Characterization of the Flexible PU Foams:

The flexible polyurethane foams produced were assessed according to the following foam properties a) to l):

a) Fallback of the foam after the end of the rise phase (=settling): The settling, or the further rise, is found from the difference of the foam height after direct blow-off and after 3 minutes after foam blow-off. The foam height is measured at the maximum in the middle of the foam crest by means of a needle secured to a centimeter scale. A positive value here describes the settling of the foam after blow-off; a negative value correspondingly describes further rise of the foam after the blow off.

b) Foam height: The height of the freely risen foam formed after 3 minutes. Foam height is reported in centimeters (cm).

c) Rise time: The period of time between the end of mixing of the reaction components and the blow-off of the polyurethane foam. The rise time is reported in seconds (s).

d) Porosity by dynamic pressure measurement: The gas permeability of the foam was determined in accordance with DIN EN ISO 4638:1993-07 by a dynamic pressure measurement on the foam. The dynamic pressure measured was reported in mm water column, and lower dynamic pressure values characterize a more open foam. The values were measured in the range from 0-300 mm water column. The dynamic pressure was measured by means of an apparatus comprising a nitrogen source, reducing valve with pressure gauge, flow regulating screw, wash bottle, flow meter, T-piece, applicator nozzle and a graduated glass tube filled with water. The applicator nozzle has an edge length of 100×100 mm, a weight of 800 g, an internal diameter of the outlet opening of 5 mm, an internal diameter of the lower applicator ring of 20 mm and an external diameter of the lower applicator ring of 30 mm. The measurement is carried out by setting the nitrogen admission pressure to 1 bar by means of the reducing valve and setting the flow rate to 480 l/h. The amount of water in the graduated glass tube is set so that no pressure difference is built up and none can be read off. For measurement on the test specimen having dimensions of 250×250×50 mm, the applicator nozzle is laid onto the corners of the test specimen, flush with the edges, and also once onto the (estimated) middle of the test specimen (in each case on the side having the greatest surface area). The result is read off when a constant dynamic pressure has been established. The final result is calculated by forming the average of the five measurements obtained.

e) Number of cells per cm (cell number): This is determined visually on a cut surface (measured to DIN EN 15702).

f) Compression hardness CLD, 40% to DIN EN ISO 33861:1997+A1:2010. The measured values are reported in kilopascals (kPa).

g) Constant Deflection Compression Set (also commonly called compression set)

Five test specimens each of size 5 cm×5 cm×2.5 cm were cut out of the finished foams. The starting thickness was measured. Compression set was measured no earlier than 72 h after production in accordance with DIN EN ISO1856 2018. The test specimens were placed between the plates of the deforming device and were compressed by 90% of their thickness (i.e. to 2.5 mm). Within 15 minutes, the test specimens were placed into an oven at 70° C. and left therein for 22 h. After this time, the apparatus was removed from the oven, the test specimens were removed from the apparatus within 1 min, and they were placed on a wood surface. After relaxation for 30 min, the thickness was measured again and the compression set was calculated and results are reported as a percentage of the original thickness:

$$DVR = (d0-dr)/d0 \times 100\%$$

h) Tensile strength and elongation at break to DIN EN ISO1798:2008. The measurements of tensile strength are reported in kilopascals (kPa), and those of elongation at break in percent (%).

i) Rebound resilience to DIN EN ISO 8307: 2007. The measurements are reported in percent (%).

j) Emission profile at room temperature according to DIN EN ISO 16000-9:2008-04. The materials are characterized here with regard to the type and the amount of the organic substances emitting therefrom. The analysis method serves to ascertain emissions from materials that are used in furniture and mattresses. This is done by using test chambers to measure the emissions at room temperature.

Analysis

Test specimen: sample preparation, sampling and specimen dimensions

The reaction mixture is transferred into a box (30 cm×30 cm base area and 30 cm height) which is covered by a PE plastic bag which is open at the top. After being poured in, the foam rose in the foaming box. In the ideal case, the foam blew off on attainment of the maximum rise height and then fell back slightly. This opened the cell membranes of the foam bubbles and an open-pore cell structure of the foam was obtained. After the foam has risen and blown off, the PE bag is closed 3 min after the blow-off. The foam is stored in this way at room temperature for 12 hours in order to enable complete reaction, but simultaneously in order to prevent premature escape of VOCs. Subsequently, the PE bag is opened, and a 7 cm×7 cm×7 cm cube is taken from the centre of the foam block and immediately wrapped in aluminium foil and sealed airtight in a PE bag. It was then transported to the analytical laboratory, and the foam cube was introduced into a cleaned 30 l glass test chamber. The conditions in the test chamber were controlled climatic conditions (temperature 21° C., air humidity 50%). Half the volume of the test chamber is exchanged per hour. After 24 hours, samples are taken from the test chamber air. Tenax adsorption tubes serve to absorb the VOCs. The Tenax tube is then heated, and the volatile substances released are cryofocused in a cold trap of a temperature-programmable evaporator with the aid of an inert gas stream. After the heating phase and cryofocusing has ended, the cold trap is rapidly heated to 280° C. and the focused substances are evaporated. They are subsequently separated in the gas chromatography separation column and detected by mass spectrometry. Calibration with reference substances permits a semi-quantitative estimate of the emission, expressed in "μg/m³". The quantitative reference substance used for the VOC analysis (VOC value) is toluene. Signal peaks can be assigned to substances using their mass spectra and retention indices. The following equipment is used for the analysis: Gerstel, D-45473 Mühlheim an der Ruhr, Eberhard-Gerstel-Platz 1, Germany, TDS-3/KAS-4, Tenax® desorption tubes, Agilent Technologies 7890A (GC)/5975C (MS), column: HP Ultra2 (50 m, 0.32 mm, 0.52 μm), carrier gas: helium. More specific procedural instructions can be taken from DIN EN ISO 16000-9:2008-04.

k) Odor testing of the resulting foams. The finished foams were packed in odor-neutral plastic bags and stored under airtight conditions. For the odor assessment of the foam, cubes measuring 10 cm×10 cm×10 cm were cut out and transferred to jars with a volume of 1 L, from which the samples were smelled. The jars were closed with a screw lid. The odor test took place after storing the jars for 24 hours at 22° C. The odor test was assessed by a panel of 13 trained odor testers. They were questioned here about the intensity of the odor, a low odor level was rated +, moderate odor ++, and high odor +++.

l) Emission of aldehydes according to VDA 275

In the method, test specimens having a certain mass and size are secured above distilled water in a closed 1 L glass bottle and stored for a defined period at constant temperature. The bottles are subsequently cooled down and the absorbed aldehydes are determined in the distilled water. The amount of aldehydes determined is based on the dry weight of the foam sample (mg/kg).

After the foams have been taken out of the foaming box, they are stored at 21° C. and about 50% relative humidity for 24 hours. Samples of the foam blocks are then taken at suitable and representative sites distributed uniformly across the width of the (cooled) foam block. The foam samples are then wrapped in aluminum foil and sealed in a polyethylene bag. The samples each have a size of 100×40×40 mm thickness (about 9 g). For each foam block, 3 test specimens are taken for the determination of aldehydes.

The sealed samples are sent for direct determination immediately after receipt. The samples are weighed on an analytical balance to an accuracy of 0.001 g before analysis. A 50 ml quantity of distilled water is pipetted into each of the glass bottles used. The samples are introduced into the glass bottle, and the vessel is sealed and kept at a constant temperature of 60° C. in a thermal cabinet for 3 hours. The vessels are removed from the thermal cabinet after the test period. After standing at room temperature for 60 minutes, the samples are removed from the test bottle. This is followed by derivatization by the DNPH method (dinitrophenylhydrazine). For this, 900 μl of the aqueous phase is admixed with 100 μl of a DNPH solution. The DNPH solution is prepared as follows: 50 mg of DNPH in 40 ml of MeCN (acetonitrile) is acidulated with 250 μl of dilute HCl (1:10) and made up to 50 ml with MeCN.

On completion of derivatization, a sample is analyzed by means of HPLC. Separation into the individual aldehyde homologues is effected.

HPLC Instrument Parameters

The following instrument is used for the analysis:

Agilent Technologies 1260

Chromatography column: Phenomenex Luna250*4.6 mm C18, 5p particle size

Eluent: water acetonitrile gradient

Detection: UV 365 nm

Results of the Foaming Experiments

The results of the influence of the recycled polyols according to the invention on foaming process and foam physical properties of the resulting hot-cure flexible PU foams are compiled in the tables below. Hot-cure flexible PU foams were produced following Formulation 1, Table 2 with a standard virgin polyol, recycled polyol not inventive and with the inventive recycled polyol.

TABLE 3

Foaming results and foam physical properties of the foams with use of different types of polyols according to Formulation 1, Table 2. For each foaming test 400 g polyol were used; the other formulation constituents were recalculated accordingly.

| Foam Sample | #1 | #2 | #3 | #4 | #5 |
|---|---|---|---|---|---|
| Arcol ®1104, OHN 56, Reference | 100 | | | 70 | 70 |
| Recycled Polyol 1 (non-inventive), OHN 82 | | 100 | | | 30 |
| Recycled Polyol 2 (inventive), OHN 55 | | | 100 | 30 | |
| Index | 105 | 105 | 105 | 105 | 105 |
| Rise time (s) | 122 | — | 123 | 122 | 129 |
| Rise height (cm) | 33.2 | — | 30.4 | 32.8 | 29.4 |
| Settling (cm) | 0.3 | — | 0.1 | 0.2 | 0.1 |
| Cells (per cm) | 12 | — | 12 | 12 | 12 |
| Porosity (mm water column) | 14 | — | 14 | 15 | 89 |
| Hardness CLD 40% compression (kPa) | 3.5 | — | 3.0 | 3.4 | 2.5 |
| Elongation (%) | 143 | — | 180 | 140 | 124 |
| Tensile Strength (kPa) | 118 | — | 136 | 125 | 110 |
| Ball Rebound (%) | 38 | — | 38 | 38 | 34 |
| Compression Set 90% 22 h at 70° C. (%) | 6 | — | 8 | 6 | 32 |
| Remarks | Standard foam | collapse | Standard foam | Standard Foam | Standard Foam |

15

The foaming results in Table 3 show that replacing the standard virgin polyol Arcol®1104 by the inventive recycled polyol 2 allows to produce flexible PU foam with comparable foaming processing characteristics to the reference foam #1. Furthermore, the foam physical properties porosity, cell count, ball rebound and compression set of the inventive foam #3 are comparable to the reference foam #1. The physical properties with respect to elongation and tensile strength are even improved by using the inventive recycled polyol #2 compared to the reference foam #1. On the contrary it was not possible to produce any reasonable foam by using 100 pphp of the non-inventive recycled polyol 1, this foam was collapsing (foam #2). Only at reduced use levels of 30 pphp for the non-inventive recycled polyol 1 in combination with the standard virgin Polyol Arcol®1104, a reasonable foam could be obtained (foam #5). But even at this lower use level, the foam physical properties were worse compared to the foam based on 100 pphp of the inventive recycled polyol 2 (foam #3). Foam #5 was significantly more closed than foam #1 or foam #3. Furthermore, the results for compression set (90% at 7000), elongation, tensile strength and ball rebound were worse for foam #5 compared to foam #3.

The results of the influence of the recycled polyols according to the invention on foam emissions at room temperature are compiled in Table 4. Hot-cure flexible PU foams were produced following Formulation 2, Table 2 by using a standard virgin polyol, a recycled polyol 1 (not inventive) or the inventive recycled polyol 2.

TABLE 4

Emission and odor testing results of the foams with use of different polyol types according to Formulation 2, Table 2. For each foaming test 300 g of polyol were used; the other formulation constituents were recalculated accordingly.

| Foam Sample | #9 | #10 | #11 |
|---|---|---|---|
| Arcol ®1104, OHN 56, Reference | 100 | | |
| Recycled Polyol 1 (non-inventive), OHN 82 | | 100 | |
| Recycled Polyol 2 (inventive), OHN 55 | | | 100 |
| Index | 110 | 110 | 110 |
| Emissions according to DIN EN ISO 16000-9:2008-04 [µg/m³] | 50 | | 140 |
| Odor | ++ | – | ++ |
| Emission of aldehydes according to VDA 275, Formaldehyde [ppm] | 0.2 | – | 0.2 |
| Emission of aldehydes according to VDA 275, Acetaldehyde [ppm] | 0.3 | – | 0.3 |
| Emission of aldehydes according to VDA 275, Propionaldehyde [ppm] | 0.3 | – | 0.2 |
| Remarks | Standard Foam | No foam | Standard Foam |

The hot-cure flexible PU foams according to the invention are found to have low emissions if emissions-optimized additives are used. This can be seen in the VOC tests according to DIN EN ISO 16000-9:2008-04. Even though the total emissions are slightly increased when using 100 pphp of the inventive recycled polyol 2 (from 50 µg/in³ for foam #9 to 140 µg/in³ for foam #11), the emissions are still well below the typical limits for TVOC of 500 µg/in³. The recycled polyol 2 is thus suitable for low-emissions formulations. On the contrary it was not possible to produce any reasonable foam by using 100 pphp of the non-inventive recycled polyol 1.

The results in Table 4 show that replacing the standard virgin polyol Arcol® 1104 by the inventive recycled polyol 2 allows to produce flexible PU foam with comparable odor characteristics as well as aldehyde emissions. The emissions of formaldehyde, acetaldehyde and propionaldehyde, measured according to VDA275, are in a comparable range for foam #9 and foam #11.

The invention claimed is:

1. A method of hydrolyzing a polyurethane, the method comprising:
   contacting said polyurethane with water in the presence of
   a base, the base comprising an alkali metal cation and/or an ammonium cation and having a $pK_b$ value at 25° C. of from 1 to 10, and
   a catalyst selected from the group consisting of a quaternary ammonium salt containing an ammonium cation containing 6 to 30 carbon atoms and an organic sulfonate containing at least 7 carbon atoms,
   to yield an active hydrogen containing polyether and an organic polyamine,
   wherein the base is selected from the group consisting of alkali metal phosphate, alkali metal hydrogen phosphate, alkali metal carbonate, alkali metal silicate, alkali metal hydrogen carbonate, alkali metal acetate, alkali metal sulfite, ammonium hydroxide, and a mixture thereof.

2. The method of claim 1, wherein an alkali metal of the base is selected from the group consisting of Na, K, Li, and a mixture thereof.

3. The method of claim 1, wherein the catalyst is a quaternary ammonium salt having the general structure $$R_1 R_2 R_3 R_4 NX$$

wherein $R_1$, $R_2$, $R_3$, and $R_4$ are the same or different, and are hydrocarbyl groups selected from alkyl, aryl, and arylalkyl, and X is selected from the group consisting of halide, hydrogen sulfate, alkyl sulfate, carbonate, hydrogen carbonate, carboxylate, and hydroxide.

4. The method of claim 3, wherein
   $R_1$ and $R_2$ are the same or different, and are alkyl groups with 1 to 12 carbon atoms, wherein the alkyl groups may be linear, branched, or cyclic, and saturated or unsaturated,
   $R_3$ is selected from the group consisting of an alkyl group with 1 to 12 carbon atoms, an aryl group with 6 to 14 carbon atoms, and an aralkyl group with 7 to 14 carbon atoms, wherein the alkyl group may be linear, branched, or cyclic, and saturated or unsaturated,
   $R_4$ is selected from the group consisting of an alkyl group with 3 to 12 carbon atoms, an aryl group with 6 to 14 carbon atoms, and an aralkyl group with 7 to 14 carbon atoms, wherein the alkyl groups may be linear, branched, or cyclic, and saturated or unsaturated, and
   X is selected from the group consisting of halide, hydrogen sulfate, alkyl sulfate, carbonate, hydrogen carbonate, acetate, and hydroxide.

5. The method of claim 3, wherein
   $R_1$ to $R_4$ are selected such that a sum of carbon atoms in the quaternary ammonium cation is 6 to 14, or
   $R_1$ to $R_4$ are selected such that the sum of carbon atoms in the quaternary ammonium cation is 15 to 30.

6. The method of claim 3, wherein $R_1$ to $R_4$ and X are selected such that a sum of carbon atoms in the quaternary ammonium salt is 6 to 14, or $R_1$ to $R_4$ and X are selected such that the sum of carbon atoms in the quaternary ammonium salt is 15 to 30.

7. The method according to claim 3, wherein X is chloride, bromide, methylsulfate, ethylsulfate, or acetate.

8. The method of claim 1, wherein the catalyst is an organic sulfonate selected from the group consisting of an alkyl aryl sulfonate, an alpha-olefin sulfonate, a petroleum sulfonate, and a naphthalene sulfonate.

9. The method of claim 1, further comprising:

separating and recovering the organic polyamine and the active hydrogen containing polyether.

10. The method of claim 1, wherein the polyurethane is foamed.

11. The method of claim 1, wherein the polyurethane is reacted with the water, the base, and the catalyst, at a temperature of from 80° C. to 200° C., and/or for 1 minute to 14 hours, and/or at atmospheric pressure.

12. The method of claim 1, wherein an amount of the catalyst is at least 0.5 weight percent, based on a weight of the polyurethane.

13. The method of claim 1, wherein a weight ratio of the base to the polyurethane is in a range of from 0.01 to 50.

14. The method of claim 1, wherein the base is in a form of a base solution comprising the base and water.

15. The method according to claim 14, wherein the base solution is a saturated base solution, and wherein a weight ratio of the saturated base solution to the polyurethane is in a range of from 0.5 to 25.

16. The method according to claim 1, further comprising:

producing a polyurethane foam with the active hydrogen containing polyether and/or the organic polyamine.

17. The method according to claim 1, wherein the polyurethane is produced by reacting an active hydrogen containing polyether and an organic polyisocyanate.

18. The method according to claim 1, wherein the active hydrogen containing polyether is a polyether polyol.

19. The method according to claim 1, wherein the base has a $pK_b$ value at 25° C. of from 1.5 to 6.

* * * * *